(No Model.) 3 Sheets—Sheet 1.

E. CLIFF.
VEHICLE SPRING.

No. 370,610. Patented Sept. 27, 1887.

WITNESSES:
C. Bendixon
H. P. Denison.

INVENTOR
Edward Cliff
BY
Duell, Lasser & Duell
ATTORNEYS

N. PETERS, Photo-Lithographer, Washington, D. C.

(No Model.) 3 Sheets—Sheet 2.
E. CLIFF.
VEHICLE SPRING.
No. 370,610. Patented Sept. 27, 1887.
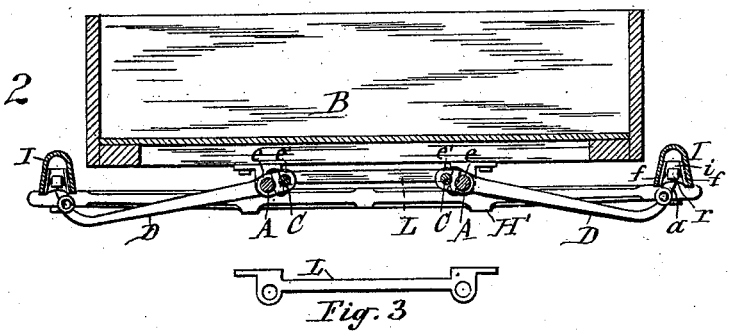
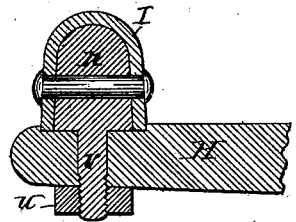
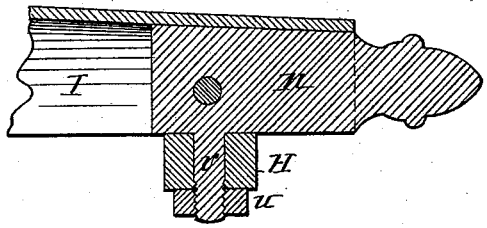
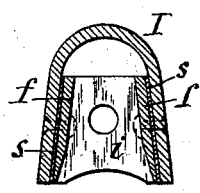
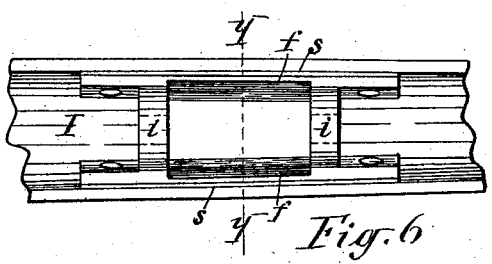
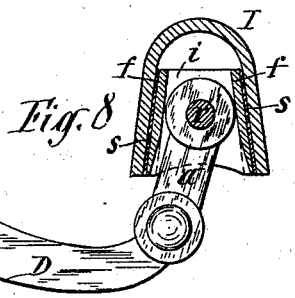
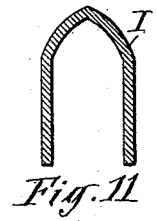
WITNESSES:
C. Bendixon
A. P. Denison
INVENTOR
Edward Cliff
BY
Duell, Laass & Duell
ATTORNEYS (No Model.) 3 Sheets—Sheet 3.

E. CLIFF.
VEHICLE SPRING.

No. 370,610. Patented Sept. 27, 1887.

WITNESSES:
C. Bendixon
A.P. Denison

INVENTOR
Edward Cliff
BY
Dindl, Laass & Dudl
ATTORNEYS

UNITED STATES PATENT OFFICE.

EDWARD CLIFF, OF OSWEGO, ASSIGNOR OF ONE-HALF TO RICHARD VOSE, OF NEW YORK, N. Y.

VEHICLE-SPRING.

SPECIFICATION forming part of Letters Patent No. 370,610, dated September 27, 1887.

Application filed April 6, 1887. Serial No. 233,877. (No model.)

*To all whom it may concern:*

Be it known that I, EDWARD CLIFF, of Oswego, in the county of Oswego, in the State of New York, have invented new and useful Improvements in Vehicle-Springs, of which the following, taken in connection with the accompanying drawings, is a full, clear, and exact description.

This invention consists in a novel organization of a system of torsional springs designed for supporting either the body of the vehicle or the seat upon the body, said system of springs effectually preventing the lateral swaying of the body when subjected to an unequally-distributed load, and at the same time possessing ample elasticity to render the vehicle comfortable to the person riding on the same.

The invention also consists in a novel construction of metallic side bars for vehicles and certain devices connected therewith for bracing the said side bars and for attaching the same, all as hereinafter fully described, and specifically set forth in the claims.

Figure 1:
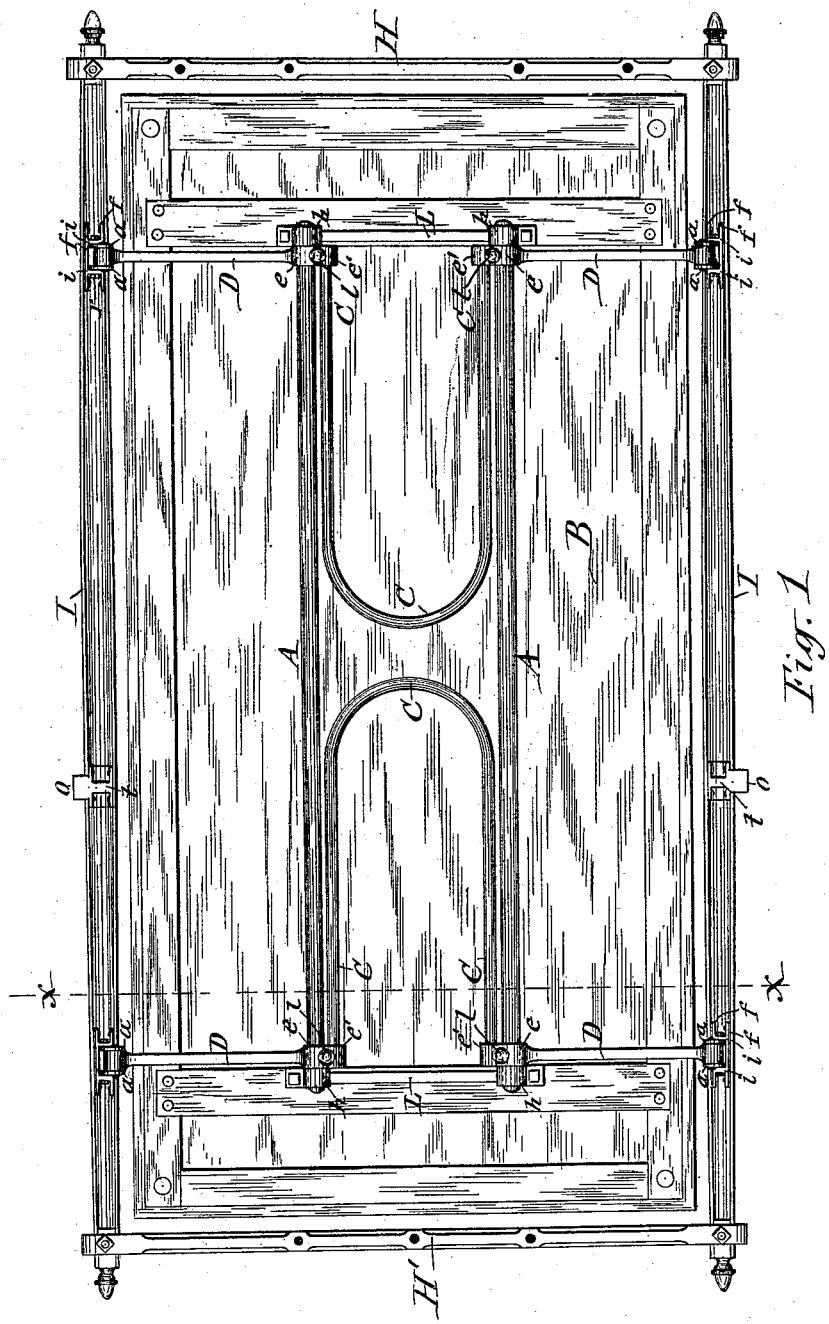
Figure 12:
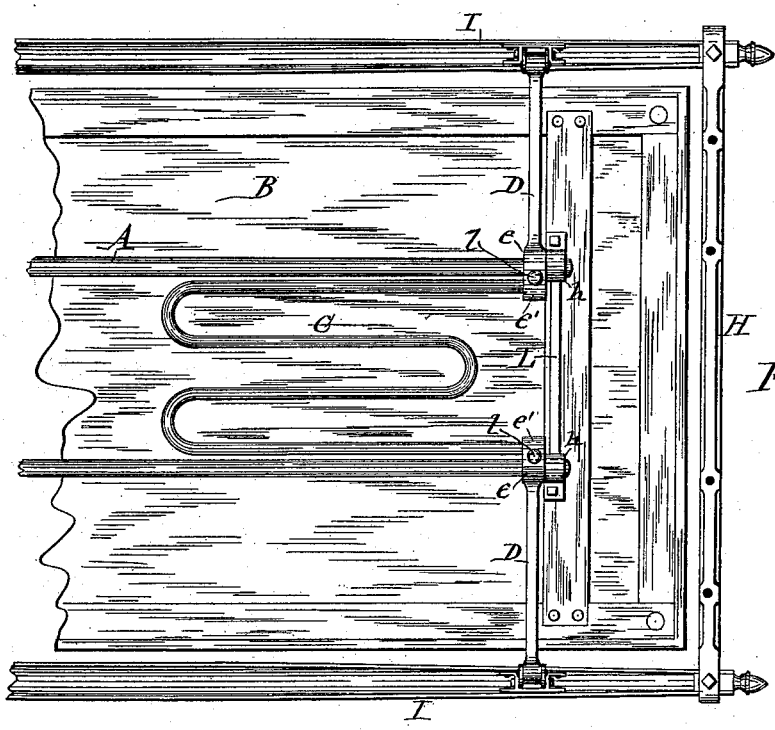
Figure 9:
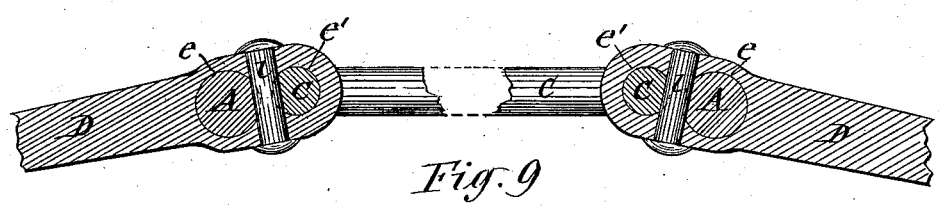
Figure 10:
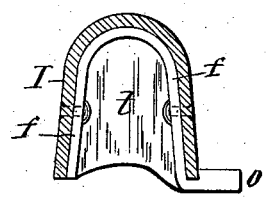

In the annexed drawings, Figure 1 is an inverted plan view of the body and side bars of a vehicle equipped with my improved system of torsional springs. Fig. 2 is a vertical transverse section on line X X, Fig. 1. Fig. 3 is a detached side view of the bar by which the spring-bars are connected to the vehicle-body. Figs. 4 and 5 are enlarged transverse and longitudinal sections of the end portion of the side bar and its attachment to the head-block. Fig. 6 is an inverted plan view of that portion of the side bar to which the body-supporting arms or levers are connected. Fig. 7 is a transverse section on line $y\ y$, Fig. 6. Fig. 8 is a transverse section of the side bar with the attachment of the body-supporting arms or levers. Fig. 9 is a longitudinal section of the inner ends of the aforesaid levers, showing their connection with the equalizing-bars and torsional springs. Fig. 10 is a transverse section of the side bar, showing the attachment of the rub-iron. Fig. 11 is a transverse section of the side bar of a modified form, and Fig. 12 is an inverted plan view of a section of a vehicle-body, showing my improved torsional spring in a modified form.

Similar letters of reference indicate corresponding parts.

H and H' represent, respectively, the hind bolster and front head-block of a vehicle. I I are the side bars mounted at their ends on the aforesaid bolster and head block, and B represents the box or body carried between the aforesaid parts, as hereinafter described. The side bar, I, I form of metal, preferably of a flat steel bar pressed or rolled or otherwise formed into an approximately U shape, or similar arch or truss shape in cross-section, as shown in Figs. 4, 7, 8, 10, and 11 of the drawings, thereby obtaining a side bar which is hollow on its under side and has a light and neat appearance, and is strong and comparatively safe from injury or breakage and free from the liability of splitting, which is one of the defects of the ordinary wooden side bars. This metallic hollow side bar I secure to the head-block H' and bolster H by means of metallic blocks $n\ n$, preferably of malleable iron, fitted closely to the interior of the end portions of the side bar and secured therein by a rivet passing horizontally through the side bar and block, as shown in Figs. 4 and 5 of the drawings. Each of said blocks is formed with a downward-projecting bolt, $v$, which passes through the head-block or bolster, and is provided with a nut, $u$, on its end. The attachment of the blocks $n\ n$ also serves to brace the end portions of the side bar.

The side bar is provided with additional braces at points intermediate its length, each of said braces consisting of metallic plates $f\ f$, riveted to the inner side of the side bar, and having integral with them two cross-ties, $i\ i$, which are perforated for the reception of the bolt $r$, by which the hangers $a\ a$ are hinged to the inner sides of the aforesaid cross-ties. On the lower ends of said hangers are pivoted the levers or arms D D D D, by which my improved system of torsional springs is connected to the vehicle. The aforesaid levers constitute two sets, each of which has its levers extended transversely under the body B, from opposite sides, part way toward the center of its width, and provided with eyes $e\ e'$ at their inner ends.

Through the eyes $e\ e\ e\ e$ of the two sets of levers pass the ends of two longitudinal steel bars, A, which are arranged parallel and equidistant from the longitudinal central line of the body and have their extremities journaled in ears h h, which are rigidly secured to the under side of the body.

Between the bars A A are arranged two spring-bars, C C, which are each preferably bent in the shape of a U, as shown in Fig. 1 of the drawings, but may also be bent into serpentine shape, as represented in Fig. 12 of the drawings, or into other suitable shape. The extremities of each of said spring-bars are inserted into the eyes $e'$ $e'$ of one of the sets of levers D D, and by rivets $l$ $l$, passing vertically through the levers between the eyes $e$ $e'$ and through grooves in the sides of the bars A A and C, said bars are firmly locked, so as to prevent them from turning on the levers. The result is that when a load is applied to the body B at either side thereof, the resultant depression of the lever D directly under the load produces a torsional strain on the spring-bar C and bar A, connected thereto, and said bars transmit the strain, respectively, to the lever at the opposite sides of the body and to the levers at the opposite end of the body.

The bars A A, I prefer to make sufficiently strong to nearly or quite equalize the strain between the two sets of levers.

$o$ denotes the so-called "rub-iron," which I form integral with the brace $t$, secured to the inner sides of the side bar, as shown in Fig. 10 of the drawings, thus adding strength to the side bar.

In order to guard against the rattling of the described braces inside of the side bars, I interpose between said parts cushions $s$ $s$, of leather or other suitable material, as represented in Figs. 7 and 8 of the drawings.

Having described my invention, what I claim as new, and desire to secure by Letters Patent, is—

1. A system of torsional springs comprising a spring-bar bent intermediate its length and terminated with its ends diametrically opposite each other and levers rigidly attached to said ends of the spring-bar and extended in opposite direction therefrom and hinged to their supports, as set forth.

2. A system of torsional springs composed of two equalizing spring-bars, A A, bent torsional springs C C, and levers D D D D, rigidly secured at their inner ends to the ends of the bars A and C and pivoted at their outer ends to their supports, as set forth.

3. The combination, with the side bars and vehicle-body, of the equalizing-bars A A, pivoted to the body, the bent torsional springs C C, arranged between the equalizing-bars, and the levers D D D D, hung on the side bars and having their inner ends rigidly secured to the ends of the bars A A and C C, substantially as described and shown.

4. In combination with the side bars, I I, and body B, hangers $a$ $a$, pivoted on the side bars, the levers D D D D, pivoted on said hangers and provided with the eyes $e$ $e'$ at their inner ends, the bars L L, secured to the under side of the body and provided with the ears $h$ $h$, the equalizing-bars A A, having their extremities extending through the eyes $e$ $e$ and pivoted in the ears $h$ $h$, the bent torsional springs C C, having their ends inserted in the eyes $e'$ $e'$, and the keys $l$ $l$, passing through the sides of the bars A and C, between the eyes $e$ $e'$, substantially as described and shown.

5. The combination of the metallic hollow side bar, arch or truss shaped in cross-section, and braces consisting of side plates, $f$ $f$, secured to the inner sides of the side bar and formed with cross-ties $i$, as described and shown.

6. In combination with the lever D and metallic hollow side bar, I, arched in cross-section, the plates $f$ $f$, secured to the inner sides of the side bar and formed with the perforated cross-ties $i$ $i$, and the hangers $a$ $a$, hung on the inner sides of said cross-ties, substantially as described and shown.

7. In combination with the metallic side bar formed hollow on its under side, the brace $t$, secured to the interior of said side bar and formed with the rub-iron $o$, substantially as described and shown.

8. The combination, with the metallic side bar formed hollow on its under side, of braces secured to the interior of said side bar and cushions interposed between said parts, substantially as and for the purpose set forth.

9. The combination, with the metallic side bar formed hollow on its under side, of the block $n$, secured to the interior of said side bar and having integral with it the attaching-bolt $v$, substantially as described and shown.

In testimony whereof I have hereunto signed my name and affixed my seal, in the presence of two attesting witnesses, at Syracuse, in the county of Onondaga, in the State of New York, this 17th day of March, 1887.

EDWARD CLIFF. [L. S.]

Witnesses:
 H. P. DENISON,
 N. M. SEAMANS.